(12) United States Patent
Tanikawa et al.

(10) Patent No.: US 8,692,512 B2
(45) Date of Patent: Apr. 8, 2014

(54) POWER SOURCE DEVICE

(75) Inventors: Tomoharu Tanikawa, Kariya (JP); Norihisa Sakakibara, Kariya (JP); Tadayoshi Kachi, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 318 days.

(21) Appl. No.: 13/237,629

(22) Filed: Sep. 20, 2011

(65) Prior Publication Data

US 2012/0068663 A1 Mar. 22, 2012

(30) Foreign Application Priority Data

Sep. 22, 2010 (JP) ................................. 2010-212452

(51) Int. Cl.
*H01M 10/46* (2006.01)
(52) U.S. Cl.
USPC .......................................... 320/109; 320/119
(58) Field of Classification Search
USPC .......... 320/104, 107, 109, 116, 119, 126, 137
See application file for complete search history.

(56) References Cited

U.S. PATENT DOCUMENTS

| 5,633,577 | A | 5/1997 | Matsumae et al. | |
| 2008/0084714 | A1* | 4/2008 | Kawasaki et al. | 363/21.01 |
| 2011/0187184 | A1 | 8/2011 | Ichikawa | |

FOREIGN PATENT DOCUMENTS

| EP | 1 633 029 A2 | 3/2006 |
| EP | 1 916 760 A2 | 4/2008 |
| EP | 1 962 415 A2 | 8/2008 |
| JP | 9-65509 A | 3/1997 |
| JP | 2008-312395 A | 12/2008 |
| JP | 2009-225587 A | 10/2009 |
| JP | 2010-068568 A | 3/2010 |
| WO | 2011/141785 A1 | 11/2011 |

OTHER PUBLICATIONS

Chinese Office Action for corresponding CN Patent Application No. 201110282051.4 issued on Oct. 28, 2013.
European Search Report dated Jan. 30, 2012 issued in corresponding European Patent Application No. 11181931.4.

* cited by examiner

*Primary Examiner* — Edward Tso
(74) *Attorney, Agent, or Firm* — Sughrue Mion, PLLC

(57) ABSTRACT

A power control device for a vehicle includes a first battery, a second battery, the voltage of which is lower than the voltage of the first battery, and a transformer. The transformer includes a primary coil, to which an alternating-current power source is connected, a first secondary coil, to which the first battery is connected, and at least one second secondary coil, to which the second battery is connected. A rectification circuit is located between the second secondary coil and the second battery. A voltage adjustment circuit is located between the rectification circuit and the second battery. A control section charges the first battery using the alternating current power source, and, simultaneously supplies electrical power to the second battery.

14 Claims, 9 Drawing Sheets

POWER SOURCE DEVICE

BACKGROUND OF THE INVENTION

The present invention relates to a power source device.

A plug-in hybrid vehicle disclosed in Japanese Laid-Open Patent Publication No. 2008-312395 and electric vehicles generally use a high-voltage battery. Such vehicles are equipped with an on-vehicle charger for charging the high-voltage battery with an external commercial power source.

The above document however does not disclose that a first battery is charged with an alternating-current power source at the same time as a second battery, the voltage of which is lower than that of the first battery, is supplied with electrical power from the alternating-current power source.

SUMMARY OF THE INVENTION

Accordingly, it is an objective of the present invention to provide a power source device that is capable of simultaneously charging a first battery with an alternating-current power source and supplying electrical power from the alternating-current power source to a second battery, the voltage of which is lower than the first battery.

To achieve the foregoing objective, a power source device in accordance with one aspect of the present invention includes at least one first battery, at least one second battery, the voltage of which is lower than that of the first battery, and a transformer. The transformer has a primary coil, to which an alternating-current power source is connected, at least one first secondary coil, to which the first battery is connected, and at least one second secondary coil, to which the second battery is connected. The power source device further includes a first power conversion circuit located between the primary coil of the transformer and the alternating-current power source, a second power conversion circuit located between the primary coil of the transformer and the first power conversion circuit, a third power conversion circuit located between the first secondary coil and the first battery, a rectification circuit located between the second secondary coil and the second battery, a voltage adjustment circuit located between the rectification circuit and the second battery, and a control section that charges the first battery using the alternating-current power source, and, simultaneously supplies electrical power to the second battery.

According to this configuration, the power source device is capable of simultaneously charging the first battery with the alternating-current power source and supplying electrical power to the second battery, the voltage of which is lower than the first battery.

In accordance with a second aspect of the present invention, in the power source device of the first aspect, the control section includes a first control section. The first control section controls, on the side of the primary coil, the first power conversion circuit and the second power conversion circuit while implementing a feedback of the output to the first battery. The first control section charges the first battery using the alternating-current power source by, on the side of the first secondary coil of the transformer, controlling the third power conversion circuit. Simultaneously, the first control circuit supplies, on the side of the second secondary coil, electrical power to the second battery from the alternating-current power source, while adjusting the output voltage to the second battery by the voltage adjustment circuit.

According to the second aspect, since a feedback of the output for the first battery is implemented, the first control section is capable of supplying electrical power to the second battery at the same time as charging the first battery.

In accordance with a third aspect of the present invention, in the power source device according to the first or second aspect, the control section includes a second control section. The second control section is configured to supply electrical power to the second battery from the first battery by, on the side of the first secondary coil, controlling the third power conversion circuit while implementing a feedback of the output to second battery.

In accordance with a fourth aspect of the present invention, in the power source device according to any one of the first to third aspects, the control section includes a third control section. The third control section outputs alternating current to the side of the alternating-current power source from the first battery, and, simultaneously supplies electrical power to the second battery.

According to the fourth aspect, the third control section is capable of simultaneously outputting alternating-current from the first battery and supplying electrical power from the alternating-current output to the low voltage second battery.

In accordance with a fifth aspect of the present invention, in the power source device according to the fourth aspect, the control section includes a fourth control section. The fourth control section generates, on the side of the primary coil of the transformer, alternating current using the second power conversion circuit and the first power conversion circuit by controlling the third power conversion circuit while implementing a feedback of the output from the alternating-current power source, and outputs alternating-current voltage to the side of the alternating-current power source from the first battery. Simultaneously, the fourth control section supplies, on the side of the second secondary coil, electrical power from the first battery to the second battery.

According to the fifth aspect, since the fourth control section implements a feedback of the output on the side of the alternating-current power source, the fourth control section is capable of simultaneously outputting alternating current and supplying electrical power to the second battery.

In accordance with a sixth aspect, the control section further includes a fifth control section that implements a feedback of the output to the second battery.

According to the sixth aspect, since the fifth control section implements feedback of both the output for the second battery and the alternating-current output, the fifth control section can control these outputs such that these do not surpass the rating of the transformer.

In accordance with a seventh aspect, in the power source device according to any one of first to sixth aspects, the power source device is designed for being mounted on a vehicle.

In accordance with an eighth aspect of the present invention, in the power source device according to the seventh aspect, the second battery is a complementary battery.

A power source device for a vehicle in accordance with a ninth aspect of the present invention includes at least one first battery, at least one second battery, the voltage of which is lower than that of the first battery, a control circuit, a system main relay, and a charger. A device that is activated at least during charging is connected to the second battery. The control circuit is connected to the first battery via line, and the control circuit controls a load. The system main relay is provided on the line. The charger is connected to a part of the line between the system main relay and the first battery, and is capable of charging the first battery using an external alternating-current power source. The transformer has a primary coil, to which an alternating-current power source is connected, at least one first secondary coil, to which the first battery is connected, and at least one second secondary coil, to which the second battery is connected. The power source device further includes a first power conversion circuit located between the primary coil of the transformer and the alternating-current power source, a second power conversion circuit located between the primary coil of the transformer and the first power conversion circuit, a third power conversion circuit located between the first secondary coil and the first battery, a rectification circuit located between the second secondary coil and the second battery, a voltage adjustment circuit located between the rectification circuit and the second battery, and a control section that charges, in a state where the system main relay is open, the first battery using the alternating-current power source, and, simultaneously supplies electrical power to the second battery.

According to the ninth aspect, charging of the first battery with the alternating-current power source is executed in a state where the system main relay is open. At the charging, the control section charges the first battery with the alternating-current power source and simultaneously supplies electrical power to the second battery.

In this manner, by adding a DC/DC converting function to the charger, necessary electrical power can be supplied, during charging, to devices that need to be operated at least during charging. Accordingly, by opening the system main relay during charging of the first battery, the consumed electrical power is reduced, and the charging efficiency is improved.

In accordance with a tenth aspect of the present invention, in the power source device for a vehicle according to the ninth aspect, the control section includes a first control section. The first control section controls, on the side of the primary coil, the first power conversion circuit and the second power conversion circuit while implementing a feedback of the output to the first battery. The first control section charges the first battery using the alternating-current power source by, on the side of the first secondary coil of the transformer, controlling the third power conversion circuit. Simultaneously, the first control circuit supplies, on the side of the second secondary coil, electrical power to the second battery from the alternating-current power source, while adjusting the output voltage to the second battery by the voltage adjustment circuit.

According to the tenth aspect, since a feedback of the output for the first battery is implemented, the first control section is capable of supplying electrical power to the second battery at the same time as charging the first battery.

In accordance with an eleventh aspect of the present invention, in the power source device according to the ninth or tenth aspect, the control section includes a second control section. The second control section is configured to supply electrical power to the second battery from the first battery by, on the side of the first secondary coil, controlling the third power conversion circuit while implementing a feedback of the output to second battery.

In accordance with a twelfth aspect of the present invention, in the power source device according to any one of ninth to eleventh aspects, the control section includes a third control section. The third control section outputs alternating current to the side of the alternating-current power source from the first battery, and, simultaneously supplies electrical power to the second battery.

According to the twelfth aspect, the third control section is capable of simultaneously outputting alternating-current from the first battery and supplying electrical power from the alternating-current output to the low voltage second battery.

In accordance with a thirteenth aspect of the present invention, in the power source device according to the twelfth aspect, the control section includes a fourth control section. The fourth control section controls the third power conversion circuit while implementing a feedback of the output from the alternating-current power source. The fourth control section generates, on the side of the primary coil of the transformer, alternating current using the second power conversion circuit and the first power conversion circuit, thereby outputting alternating-current voltage to the side of the alternating-current power source from the first battery. Simultaneously, the third power conversion circuit is configured to supply, on the side of the second secondary coil, electrical power to the second battery.

According to the thirteenth aspect, since a feedback of the output of alternating-current voltage is implemented, the fourth control section is capable of simultaneously outputting alternating current to the alternating-current power source and supplying electrical power to the second battery.

In accordance with a fourteenth aspect, in the power source device according to the thirteenth aspect, the control section further includes a fifth control section that implements a feedback of the output to the second battery.

According to the fourteenth aspect, since the fifth control section implements feedback of both the output for the second battery and the alternating-current output, the fifth control section can control these outputs such that these do not surpass the rating of the transformer.

According to the present invention, it is possible to simultaneously charge the first battery with the alternating-current power source and supply electrical power from the alternating-current power source to the second battery, the voltage of which is lower than the first battery.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

Figure 1:
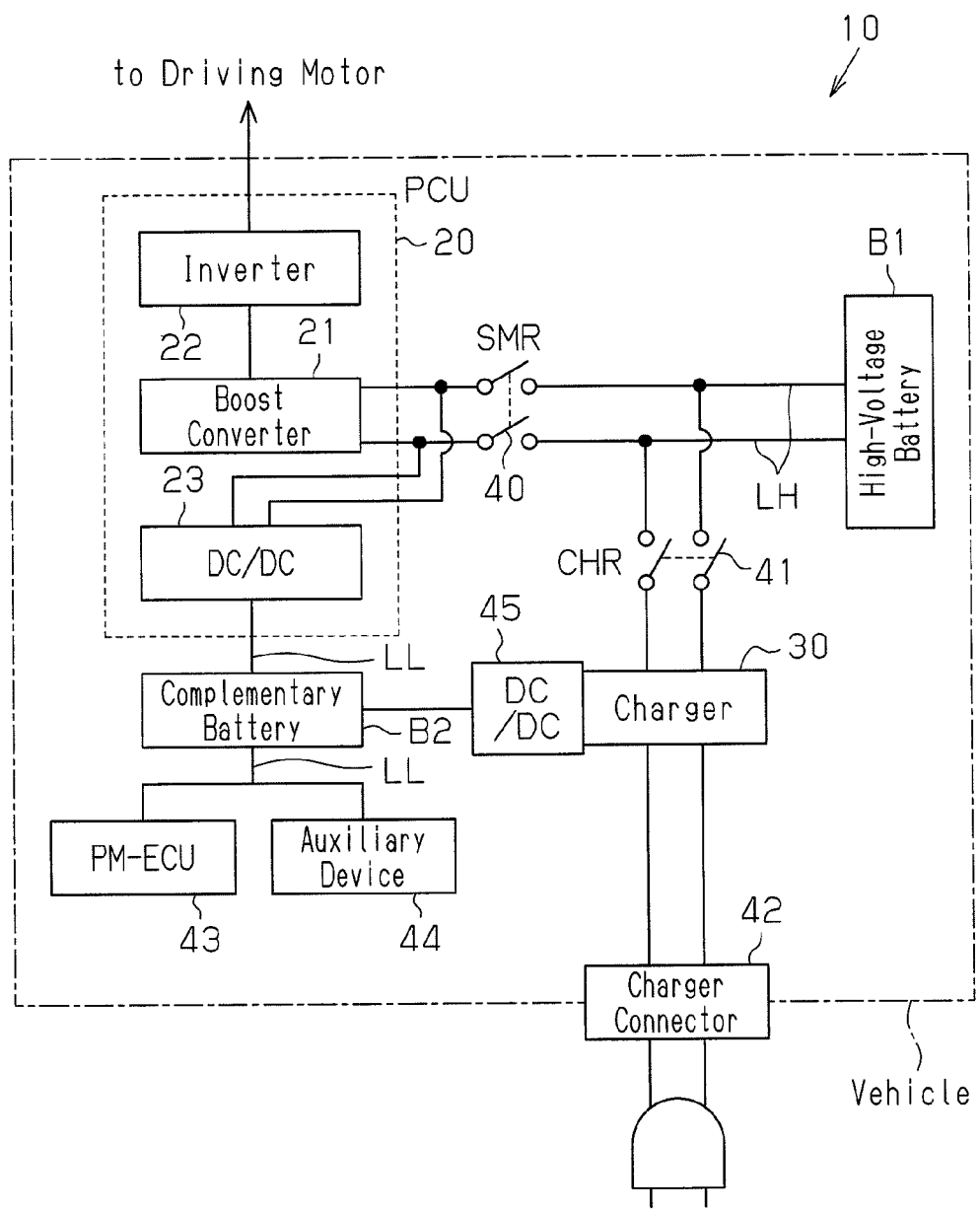
FIG. 1 is a system diagram showing a power source device according to a first embodiment.
Figure 2:
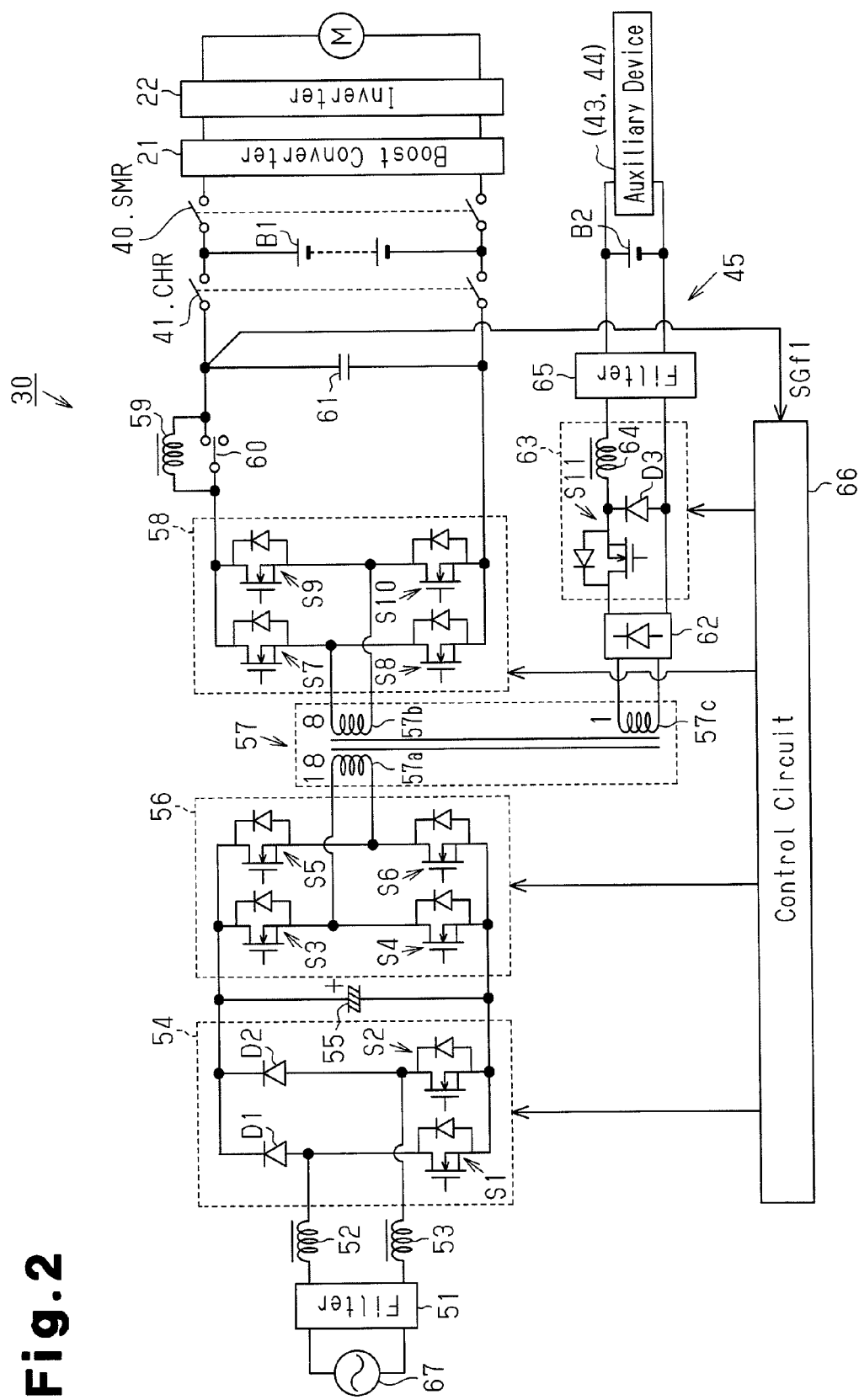
FIG. 2 is a circuit diagram of the power source device according to the first embodiment.
Figure 3:
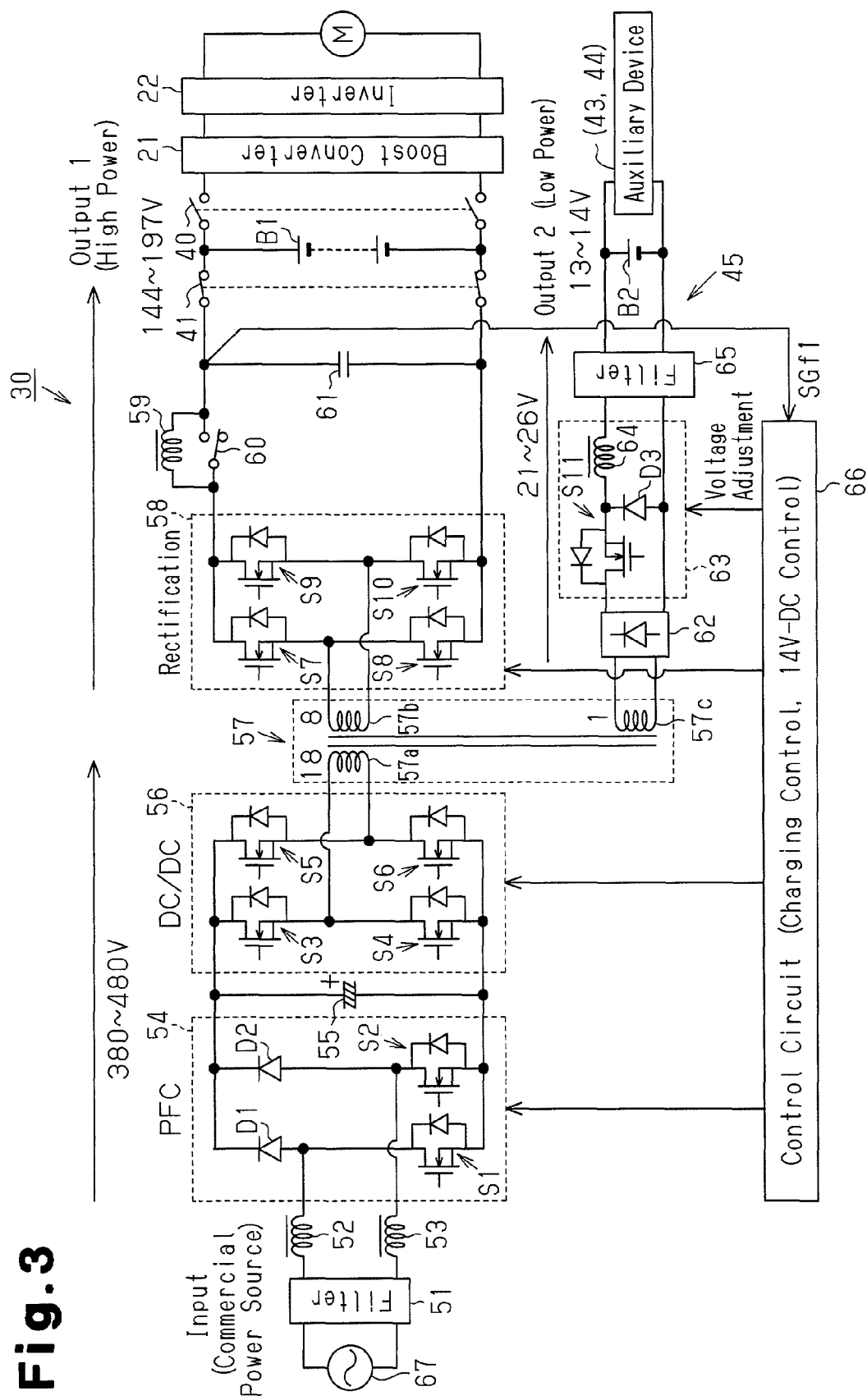
FIG. 3 is an explanatory circuit diagram describing operation of the power source device.

FIGS. 1 to 3 show a first embodiment of the present invention.

FIG. 1 is a system diagram showing a power source device 10 according to the first embodiment. FIG. 2 shows the circuit configuration of the power source device 10 of the first embodiment. The power source device 10 is an on-vehicle power source device mounted on a plug-in hybrid vehicle or an electric car.

As shown in FIG. 1, the power source device 10 includes a high-voltage battery B1 serving as a first battery, a complementary battery B2 serving as a second battery the voltage of which is lower than that of the high-voltage battery B1, a power control unit (PCU) 20, a charger 30, a system main relay (SMR) 40, and a charger relay (CHR) 41. The PCU 20 includes a boost converter 21, an inverter 22, and a DC/DC converter 23.

The boost converter 21 and the high-voltage battery B1 are connected to each other by a high-voltage line LH. A system main relay (SMR) 40 is arranged on a part of the high-voltage line LH between the boost converter 21 and the high-voltage battery B1. The charger 30 is connected to the system main relay 40 on the high-voltage line LH and the high-voltage battery B1 via the charger relay 41.

The charger 30 is configured to be connected to a commercial power source (designated with reference numeral 67 in FIG. 2) serving as an external alternating-current power source via a charger connector 42. The charger 30 is capable of charging the high-voltage battery B1 with a commercial power source.

The inverter 22 is connected to a driving motor (designated with reference sign M in FIG. 2) for moving the vehicle. The boost converter 21 raises the high voltage of the high-voltage battery B1, and the inverter 22 uses the raised voltage to operate the driving motor. In this manner, the boost converter 21 and the inverter 22 each form a control circuit, are connected to the high-voltage battery B1 via high-voltage lines LH, and are configured to control the driving motor, which is a load.

The DC/DC converter 23 of the PCU 20 is connected to a part of the high-voltage line LH between the system main relay 40 and the boost converter 21. The DC/DC converter 23 converts the high voltage of the high-voltage battery B1 into a low voltage for auxiliary devices. The DC/DC converter 23 is connected to a complementary battery B2 via a low-voltage line LL, and the complementary battery B2 is connected to auxiliary devices (43, 44) via another low-voltage line LL. The auxiliary devices include a power management ECU (PM-ECU) 43 and other auxiliary devices 44.

The power management ECU 43 is configured, for example, to monitor the state of charge of the batteries S1, B2. In this manner, the power management ECU 43, which is activated at least during charging, is connected to the complementary battery B2.

The charger 30 has a DC/DC converter 45. The complementary battery B2 is connected to the DC/DC converter 45. The DC/DC converter 45 is configured to supply electrical power to the complementary battery B2.

The charger 30 includes, as shown from the left to the center of FIG. 2, a filter 51, coils 52, 53, a first H-bridge circuit 54 serving as a first switching circuit, a capacitor 55, a second H-bridge circuit 56 serving as a second switching circuit, and a transformer 57. The transformer 57 includes a primary coil 57a, a first secondary coil 57b, and a second secondary coil 57c. The components 51 to 56 are located on the side of the primary coil 57a of the transformer 57.

Further, the charger 30 includes, as shown from the center to the right of FIG. 2, a third H-bridge circuit 58 serving as a third switching circuit, a coil 59, a relay 60, and a capacitor 61. These components 58 to 61 are located on the side of the first secondary coil 57b of the transformer 57. The charger 30 also includes, from the center lower part to the right of FIG. 2, a rectifier 62, a voltage adjustment circuit 63 serving as a fourth switching circuit, a filter 65, and a control circuit 66 serving as a control section (the components 62, 63, 65 are collectively designated with reference numeral 45 in FIG. 1). These components 62 to 65 are located on the side of the second secondary coil 57c of the transformer 57.

As shown in FIG. 2, the first H-bridge circuit 54, which is capable of power factor correction, is located on the side of the primary coil 57a of the transformer 57. The first H-bridge circuit 54 includes diodes D1, D2 and switching elements S1, S2 each formed by a MOSFET. A parasitic diode is connected in parallel with each MOSFET. The anode terminal of the diode D1 and the drain terminal of the switching element S1 are connected to each other. The anode terminal of the diode D2 and the drain terminal of the switching element S2 are connected to each other. The cathode terminal of the diode D1 and the cathode terminal of the diode D2 are connected to each other. The source terminal of the switching element S1 and the source terminal of the switching element S2 are connected to each other.

One end of the coil 52 is connected to a point between the diode D1 and the switching element S1. The other end of the coil 52 is connected to the commercial power source 67, which serves as an alternating-current power source, via the filter 51. One end of the coil 53 is connected to a point between the diode D2 and the switching element S2. The other end of the coil 53 is connected to the commercial power source 67 via the filter 51.

The capacitor 55 is connected to a point between the cathode terminals of the diodes D1, D2 and the source terminals of the switching elements S1, S2.

The second H-bridge circuit 56, which is capable of implementing DC/DC conversion, is located on the side of the primary coil 57a of the transformer 57. The second H-bridge circuit 56 is arranged between the primary coil 57a and the first H-bridge circuit 54. The second H-bridge circuit 56 has switching elements S3, S4, S5, S6 each formed by a MOSFET. A parasitic diode is connected in parallel with each MOSFET. The source terminal of the switching element S3 and the drain terminal of the switching element S4 are connected to each other. The source terminal of the switching element S5 and the drain terminal of the switching element S6 are connected to each other. The drain terminal of the switching element S3 and the drain terminal of the switching element S5 are connected to each other. The source terminal of the switching element S4 and the source terminal of the switching element S6 are connected to each other.

The drain terminals of the switching elements S3, S5 and the source terminals of the switching elements S4, S6 are connected to the capacitor 55.

A point between the switching element S3 and the switching element S4 is connected to one terminal of the primary coil 57a of the transformer 57. A point between the switching element S5 and the switching element S6 is connected to the other terminal of the primary coil 57a of the transformer 57.

In this manner, the commercial power source 67 is connected to the primary coil 57a of the transformer 57 via the second H-bridge circuit 56 and the first H-bridge circuit 54.

As shown in FIG. 2, the third H-bridge circuit 58, which is capable of implementing rectification, is located on the side of the first secondary coil 57b of the transformer 57. The third H-bridge circuit 58 has switching elements S7, S8, S9, S10 each formed by a MOSFET. A parasitic diode is connected in parallel with each MOSFET. The source terminal of the switching element S7 and the drain terminal of the switching element S8 are connected to each other. The source terminal of the switching element S9 and the drain terminal of the switching element S10 are connected to each other. The drain terminal of the switching element S7 and the drain terminal of the switching element S9 are connected to each other. The source terminal of the switching element S8 and the source terminal of the switching element S10 are connected to each other.

A point between the switching element S7 and the switching element S8 is connected to one terminal of the first secondary coil 57b of the transformer 57. A point between the switching element S9 and the switching element S10 is connected to the other terminal of the first secondary coil 57b of the transformer 57.

The drain terminals of the switching elements S7, S9 are connected to one electrode of the capacitor 61 via the coil 59. The source terminals of the switching elements S8, S10 are connected to the other electrode of the capacitor 61. The relay 60 is connected in parallel with the coil 59. When the relay 60 is activated, the drain terminals of the switching elements S7, S9 are connected with one electrode of the capacitor 61 via the coil 59. Alternatively, the relay 60 in the closed state directly connects the drain terminals of the switching elements S7, S9 with one electrode of the capacitor 61 without the coil 59 in between.

The capacitor 61 is connected to the high-voltage battery B1, which serves as a first battery, via the charger relay 41. The first secondary coil 57b of the transformer 57 is connected to the high-voltage battery B1 via the third H-bridge circuit 58. The high-voltage battery B1 is connected to the boost converter 21 via the system main relay 40. The boost converter 21 is connected to the vehicle driving motor M via the inverter 22.

As shown in a right lower section in FIG. 2, the voltage adjustment circuit 63, which is capable of adjusting voltage, is located on the side of the second secondary coil 57c of the transformer 57. The voltage adjustment circuit 63 includes a switching element S11, a diode D3, and a coil 64. The switching element S11 is formed by a MOSFET. A parasitic diode is connected in parallel with the MOSFET. The drain terminal of the switching element S11 is connected to one terminal of the second secondary coil 57c of the transformer 57 via the rectifier 62. The source terminal of the switching element S11 is connected to one end of the coil 64. The other end of the coil 64 is connected to the positive terminal of the complementary battery B2 via the filter 65. The source terminal of the switching element S11 is connected to the cathode terminal of the diode D3. The anode terminal of the diode D3 is connected to the other terminal of the second secondary coil 57c of the transformer 57 via the rectifier 62. The anode terminal of the diode D3 is connected to the negative terminal of the complementary battery B2 via the filter 65. The complementary battery B2 is connected auxiliary devices (the power management ECU 43 and other auxiliary devices 44).

As described above, the second secondary coil 57c of the transformer 57 is connected to the complementary battery B2 via the voltage adjustment circuit 63. Also, the primary coil 57a of the transformer 57 is connected to the commercial power source 67. Thus, the transformer 57 has, on the side of the secondary coils, the first secondary coil 57b, which is connected to the high-voltage battery B1, and the second secondary coil 57c, which is connected to the complementary battery B2.

As shown in FIG. 2, the control circuit 66 controls the switching elements S1, S2 of the first H-bridge circuit 54, the switching elements S3, S4, S5, S6 of the second H-bridge circuit 56, the switching element S7, S8, S9, S10 of the third H-bridge circuit 58, and the switching element S11 of the voltage adjustment circuit 63.

The control circuit 66 receives a feedback signal SGf1. The feedback signal SGf1 is a detection signal for detecting the output voltage from the charger relay 41 to the high-voltage battery B1.

In the present embodiment, the first H-bridge circuit 54 corresponds to a first power conversion circuit provided between the primary coil 57a of the transformer 57 and the commercial power source 67. The second H-bridge circuit 56 corresponds to a second power conversion circuit provided between the primary coil 57a of the transformer 57 and the first power conversion circuit. The third H-bridge circuit 58 corresponds to a third power conversion circuit provided between the first secondary coil 57b and the high-voltage battery B1. The rectifier 62 corresponds to a rectification circuit provided between the second secondary coil 57c and the complementary battery B2. The voltage adjustment circuit 63 is provided between the rectifier 62 (rectification circuit) and the complementary battery B2.

(Operation)

FIG. 3 shows operation of the power source device 10 as described above, that is, charging of the batteries B1, B2.

First, the system main relay 40 is turned off (opened). Also, the charger relay 41 is turned on (closed).

Alternating-current voltage from the commercial power source 67 is supplied, via the filter 51, to a power factor correction circuit formed by the coils 52, 53, the first H-bridge circuit 54, and the capacitor 55. The switching elements S1, S2 of the first H-bridge circuit are alternately turned on and off by a control signal from the control circuit 66. Specifically, when the alternating-current voltage and the alternating current delivered to the first H-bridge circuit 54 are positive, the switching element S1 is turned on and off. When the switching element S1 is turned on, a current flows in the order of the coil 52→the switching element S1→the parasitic diode of the switching element S2→the coil 53, so that electric energy is stored in the coils 52, 53. When the switching element S1 is turned off, a current flows in the order of the coil 52→the diode D1→the capacitor 55→the parasitic diode of the switching element S2→the coil 53 in a state where electric energy is stored in the coils 52, 53. When the alternating-current voltage and the alternating current delivered to the first H-bridge circuit 54 are negative, the switching element S2 is turned on and off. When the switching element S2 is turned on, a current flows in the order of the coil 53→the switching element S2 the parasitic diode of the switching element S1 the coil 52, so that electric energy is stored in the coils 52, 53. When the switching element S2 is turned off, a current flows in the order of the coil 53→the diode D2→the capacitor 55→the parasitic diode of the switching element S1→the coil 52 in a state where electric energy is stored in the coils 52, 53.

Through ON/OFF control of the switching elements S1, S2, the alternating-current voltage is raised using the two coils 52, 53 and smoothed. Also, power factor correction is implemented in which the phase and waveform of the alternating current are matched with or made similar to those of the alternating-current voltage. Specifically, the duty cycle of the switching elements S1, S2 is changed (duty control is implemented) to smooth the alternating-current voltage, to raise the voltage by using the two coils 52, 53, and to implement power factor correction, in which the phase and waveform of the alternating current are matched with or made similar to those of the alternating-current voltage.

Further, with reference to FIG. 3, operation at the second H-bridge circuit 56, the transformer 57, and the third H-bridge circuit 58 will now be described. The switching elements S3 to S6 of the second H-bridge circuit 56 are subjected to switching control by a control signal from the control circuit 66, so as to convert direct-current voltage supplied from the first H-bridge circuit 54 into alternating-current voltage. The converted alternating-current voltage is supplied to the primary coil 57a of the transformer 57, so that an alternating-current voltage is induced in the first secondary coil 57b of the transformer 57. The switching elements S7 to S10 of the third H-bridge circuit 58 are controlled by a control signal from the control circuit 66, so as to convert the alternating-current voltage induced by the first secondary coil 57b into direct-current voltage. Then, the direct-current voltage is output to the high-voltage battery B1, so that the high-voltage battery B1 is charged.

In this manner, the control circuit 66 charges the high-voltage battery B1 by causing, on the side of primary coil 57a of the transformer 57, the first H-bridge circuit 54 to implement power factor correction and the second H-bridge circuit 56 to implement DC/DC conversion, and causing, on the side of the first secondary coil 57b of the transformer 57, the third H-bridge circuit 58 to implement rectification. At this time, the power factor correction circuit raises the voltage to 380 to 480 volts. The high voltage output, which is the output from the charger relay 41 to the high-voltage battery B1 is 144 to 197 volts.

The charging of the high-voltage battery B1, that is, the output operation to a first output 1, is executed by sending the feedback signal SGf1 to the control circuit 66. Specifically, while the charger 30 implements a feedback of the output for the high-voltage battery B1 to the control circuit 66, the charging is executed such that the output voltage for the high-voltage battery B1 reaches a predetermined high voltage output (voltage).

At the same time, on the side of the second secondary coil 57c of the transformer 57, the alternating-current voltage induced by the second secondary coil 57c is converted into direct-current voltage by the rectifier 62. The direct-current voltage is supplied to the voltage adjustment circuit 63. The switching element S11 of the voltage adjustment circuit 63 is turned on and off by a control signal from the control circuit 66. The output voltage to the complementary battery B2 is adjusted to a constant value through the ON-OFF control, and the voltage adjustment circuit 63 outputs a low voltage of 13 to 14 volts, as a second output 2, to the complementary battery B2. Accordingly, the control circuit 66 supplies electrical power to the complementary battery B2.

That is, the control circuit 66 outputs electrical power of the first output 1 (high voltage output) from the commercial power source 67 of the input to the high-voltage battery B1, and outputs electrical power of the second output (complementary output) to the complementary battery B2.

At this time, since the output electrical power to the complementary system, or the complementary output, is needed by the power management ECU 43 during charging of the batteries B1, B2, the complementary output is set to approximately 100 W.

As described above, upon controlling charging of batteries B1, B2, the control circuit 66 receives a feedback signal SGf1 showing a high voltage output for the first battery B1. That is, since the electrical power of the high voltage output for the first battery B1 is set at several kilo-Watts (kW), the high voltage output for the first battery B1 is larger than a complementary output for the second battery B2. Therefore, the control circuit 66 implements a feedback of control to the charger 30 based on the high voltage output for the first battery B1, sets the complementary output for the second battery B2 as a voltage within a range of 21-26 V, which depends on the high voltage output for the first battery B1 and is higher than the desired voltage (approximately 13-14 V) for the second battery B2, and adjusts the voltage for the second battery B2 via the voltage adjustment circuit 63.

Figure 6:
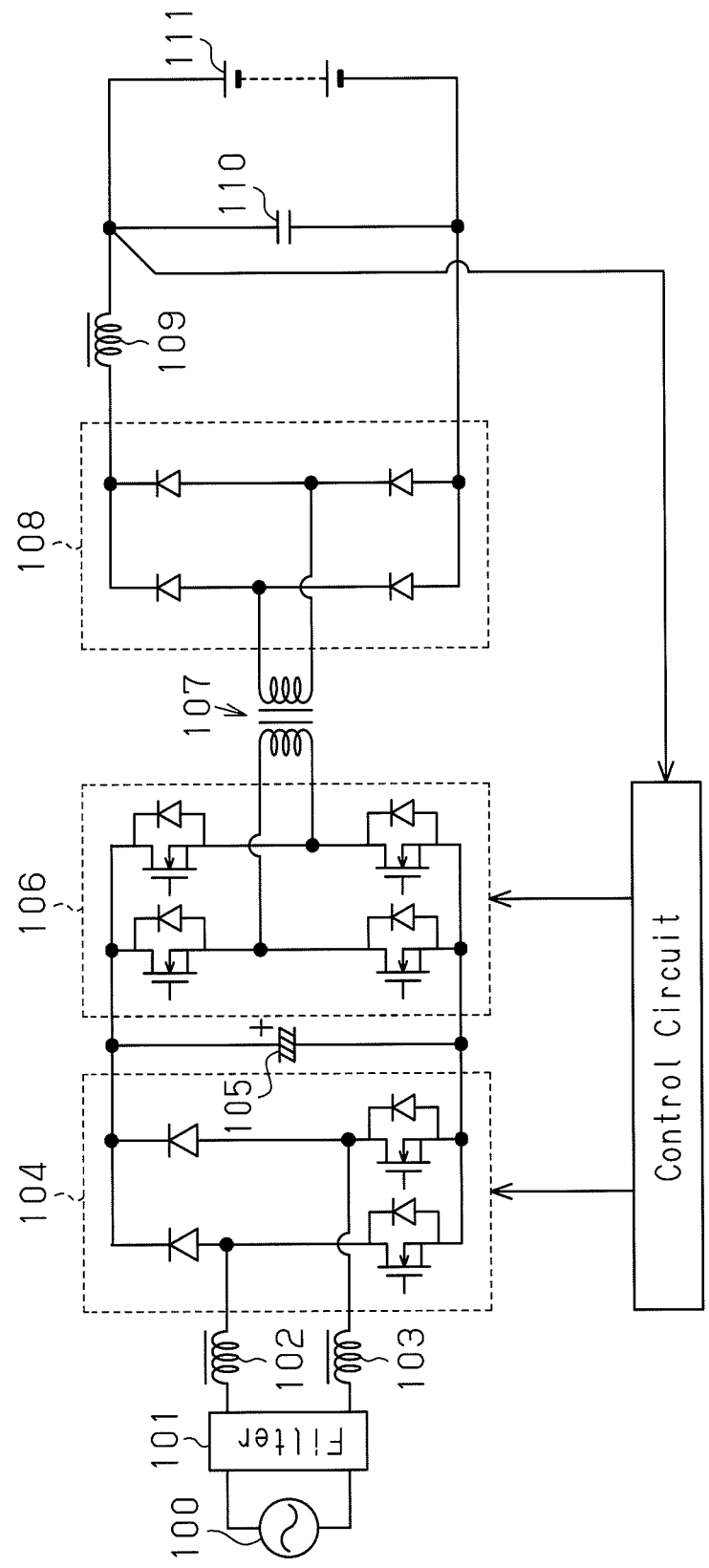
FIG. 6 is a circuit diagram showing a typical on-vehicle charger.

FIG. 6 is a circuit diagram of a typical on-vehicle charger. In FIG. 6, a high-voltage battery 111 is connected to an external commercial power source 100 via a filter 101, coils 102, 103, a power factor correction H-bridge circuit 104, a capacitor 105, a DC/DC conversion H-bridge circuit 106, a transformer 107, a rectification H-bridge circuit 108, a coil 109, and a capacitor 110.

Figure 7:
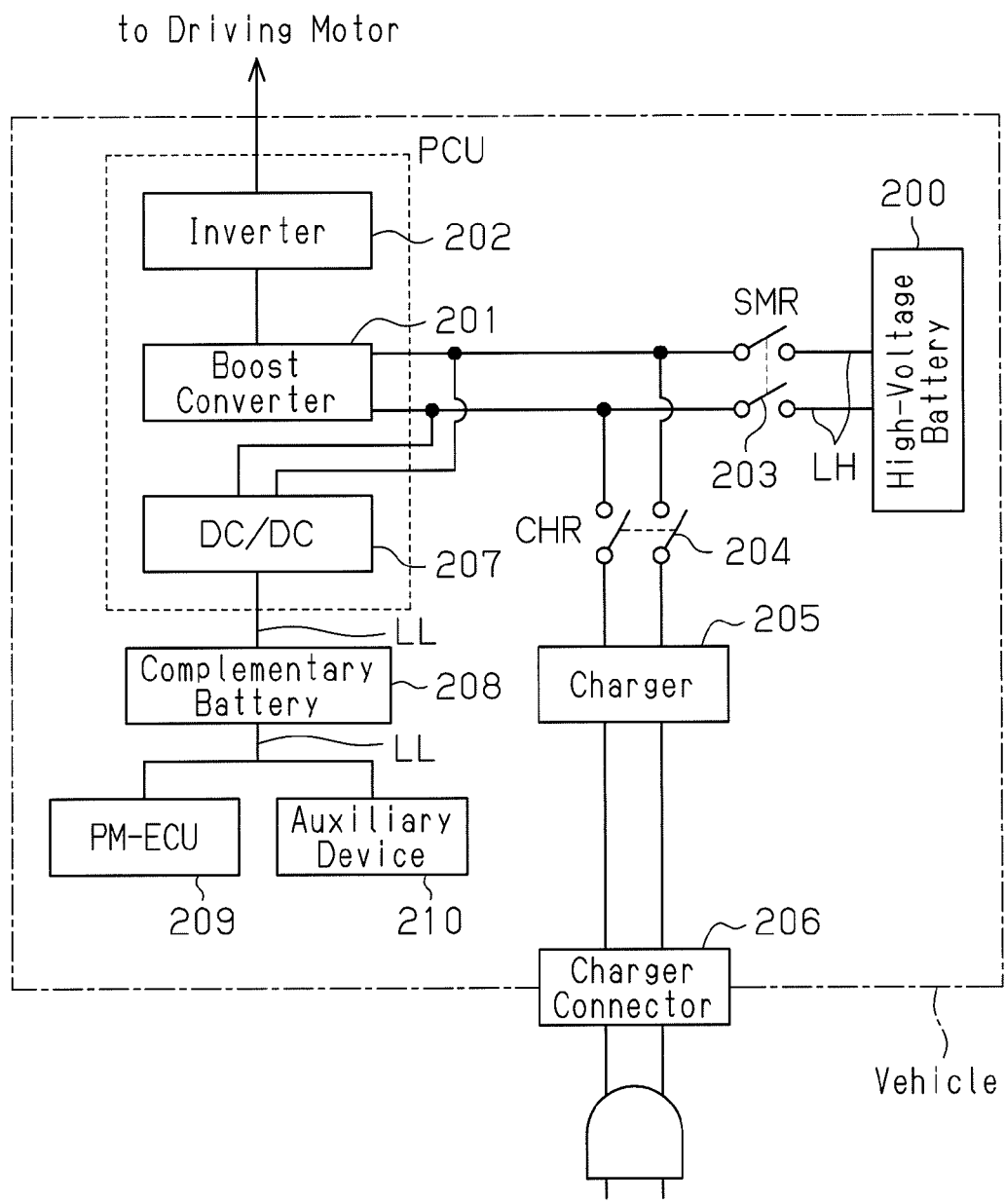
FIG. 7 is a system diagram showing a typical on-vehicle charger.

FIG. 7 shows an example of a system configuration of a typical on-vehicle charger. In FIG. 7, an inverter 202 is connected to a high-voltage battery 200 via a high-voltage line LH and a boost converter 201. The inverter 202 drives the driving motor. A system main relay (SMR) 203 is located on the high-voltage line LH connecting the high-voltage battery 200 to the boost converter 201. A charger 205 is connected, via a charger relay (CHR) 204, to a part of the high voltage line LH that is between the system main relay 203 and the boost converter 201. The charger 205 is connected to an external commercial power source (a commercial power source 100 in FIG. 6) via a charger connector 206.

Also, a DC/DC converter 207 is connected to a part of the high-voltage line LH between the system main relay 203 and the boost converter 201. A complementary battery 208 is connected to the DC/DC converter 207 via a low-voltage line LL. Auxiliary devices (209, 210) are connected to the complementary battery 208 via a low-voltage line LL. The auxiliary devices include a power management ECU (PM-ECU) 209 and other auxiliary devices 210. The power management ECU 209, for example, monitors the state of charge of the batteries 200, 208.

During charging of the high-voltage battery 200, the system main relay 203 and the charger relay 204 are closed, so that the charger 205 charges the high-voltage battery 200.

However, during charging of the high-voltage battery 200, the charger 205 needs to supply electrical power to components such as the power management ECU 209 and therefore needs to activate the DC/DC converter 207.

Therefore, in the case of FIG. 7, since the auxiliary devices on the vehicle operate during charging of the high-voltage battery 200, the consumed electrical power is increased, which, in turn, lowers the charging efficiency.

Unlike the charger 205 shown in FIG. 7, the charger 30 of the present embodiment shown in FIG. 1 is connected to a point between the system main relay 40 and the high-voltage battery B1. During charging of the high-voltage battery B1, the system main relay 40 is turned off so that the charger 30 does not supply electrical power to the inverter 22 or the DC/DC converter 23. By adding the DC/DC converter function (45) to the charger 30 shown in FIG. 1, the charger 30 supplies necessary electrical power to the power management ECU 43 during charging of the high-voltage battery B1. That is, unlike the typical charger shown in FIG. 6, the present embodiment has the second secondary coil 57c (an output coil) of the transformer 57 as shown in FIG. 2, so that the control circuit 66 can output electrical power to the complementary system. Accordingly, in the present embodiment, when electrical power is supplied to the power management ECU 43 during charging of the high-voltage battery B1, the DC/DC converter 23 does not need to be activated (the complementary system of the vehicle does not need to be activated). Accordingly, in the present embodiment, by opening the system main relay 40 during charging of the high-voltage battery B1, the control circuit 66 can reduce the consumed electrical power and improve the charging efficiency. That is, the control circuit 66 can cut unnecessary consumption of electrical power and charge the high-voltage battery B1 from the commercial power source (the alternating-current power source) 67 at a high charging efficiency.

The above described embodiment has the following advantages.

(1) The control circuit 66 serving as control means, or a control section, charges the high-voltage battery B1 from the commercial power source 67, and supplies electrical power to the complementary battery B2 at the same time. According to this configuration, the control circuit 66 is capable of simultaneously charging the high-voltage battery B1 from the commercial power source 67 and supplying electrical power to the low-voltage complementary battery B2, the voltage of which is lower than the high-voltage battery B1.

(2) Specifically, while implementing a feedback of the output to the high-voltage battery B1, the control circuit 66 serving as the first control section controls the first H-bridge circuit 54 and the second H-bridge circuit 56 on the side of the primary coil 57a of the transformer 57, and controls the third H-bridge circuit 58 on the side of the first secondary coil 57b of the transformer 57, thereby charging the high-voltage battery B1 from the commercial power source 67.

Simultaneously, the control circuit 66 serving as the first control section supplies electrical power to the complementary battery B2 from the commercial power source 67 while, on the side of the second secondary coil 57c, adjusting the output voltage from the voltage adjustment circuit 63 to the complementary battery B2. In other words, the control circuit 66 has the first control section. That is, while implementing a feedback of the output to the high voltage battery B1 from the commercial power source 67, the control circuit 66 implements, on the side of the primary coil 57a of the transformer 57, power factor correction using the first H-bridge circuit 54 and DC/DC conversion using the second H-bridge circuit 56.

Also, the control circuit 66 implements rectification using the third H-bridge circuit 58 on the side of the first secondary coil 57b of the transformer 57, thereby charging the high-voltage battery B1. Simultaneously, the control circuit 66 supplies electrical power to the complementary battery B2 while, on the side of the second secondary coil 57c of the transformer 57, adjusting the output voltage from the voltage adjustment circuit 63 to the complementary battery B2 at a constant value. Accordingly, since the control circuit 66 implements a feedback of the output to the high-voltage battery B1, the control circuit 66 is capable of supplying electrical power to the complementary battery B2 at the same time as charging the high-voltage battery B1.

Further, as a modification, the second H-bridge circuit 56, which is located downstream of the first H-bridge circuit (PFC circuit) 54 of FIG. 2, may be a push-pull circuit.

Figure 4:
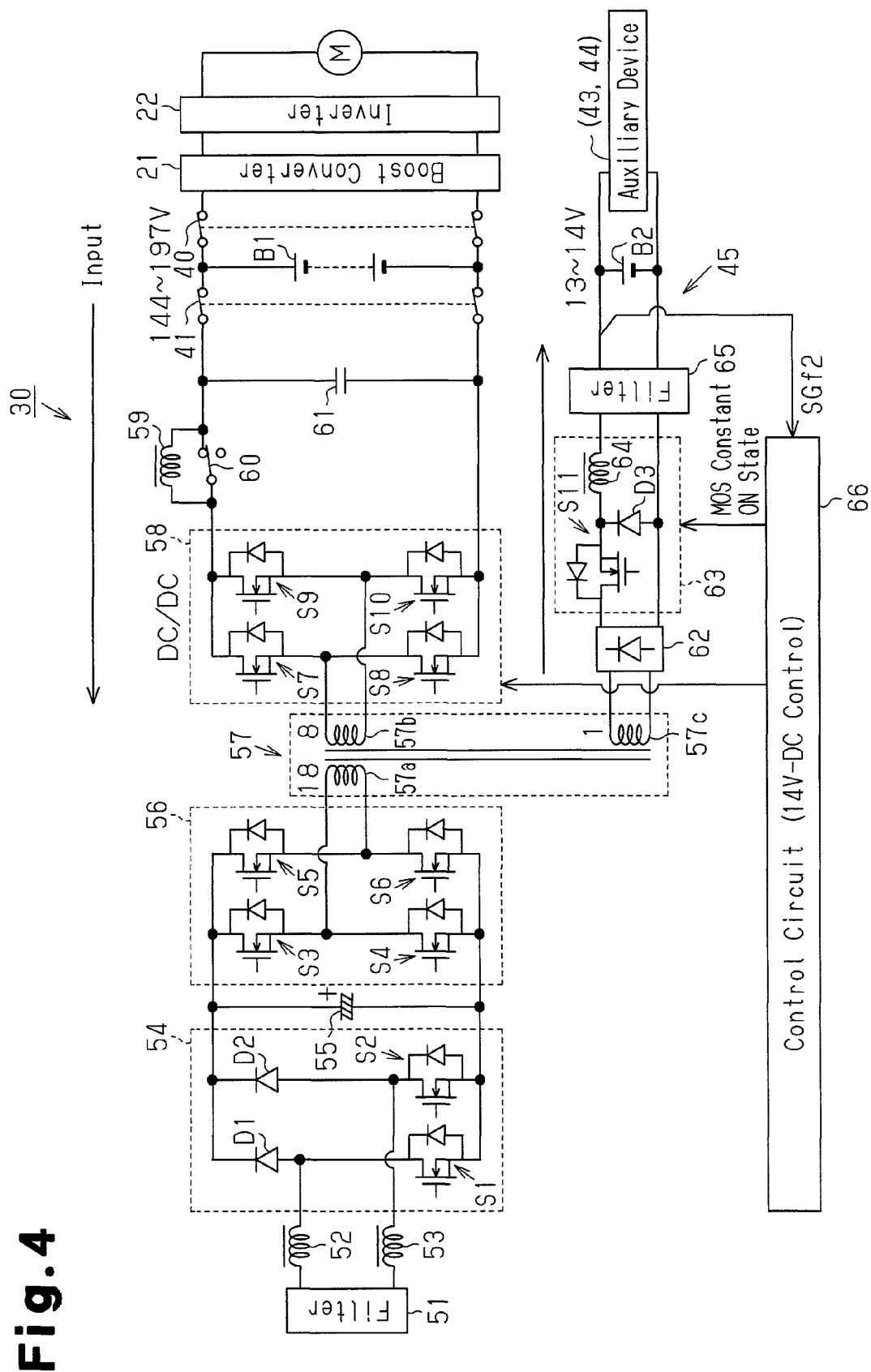
FIG. 4 is an explanatory circuit diagram describing operation of a power source device according to a second embodiment.

FIG. 4 shows a second embodiment. The differences from the first embodiment will be mainly discussed. In the present embodiment, the low-voltage battery B2 is charged not by the output of the alternating-current power source 67, but by the output of the high-voltage battery B1.

The power source device of the present embodiment also has the circuit configuration shown in FIG. 2.

Operation of the power source device of the present embodiment will now be described.

The operation during charging will be described with reference to FIG. 3 discussed above.

In a state where the system main relay 40 is off (open) and the charger relay 41 is on (closed), the control circuit 66 performs output 1 (high voltage output) from the commercial power source 67 of the input to the high-voltage battery B1 and simultaneously performs output 2 to the complementary battery B2.

At this time, since the output electrical power to the complementary system, or the complementary output, is needed by the power management ECU 43 during charging of the batteries B1, B2, the complementary output is set to approximately 100 W.

Since the electrical power of the high voltage output for the high-voltage battery B1 is set at several kilo-Watts (kW), the electrical power of the high voltage output is larger than that of the complementary output. Therefore, the control circuit 66 implements a feedback of control based on the feedback signal SGf1 indicating a high voltage output, sets the complementary output as a voltage within a range of 21-26 V, which is higher than the desired voltage (approximately 13-14 V), and adjusts the voltage via the voltage adjustment circuit 63.

FIG. 4 describes a state in which the vehicle is moving.

In a state where the system main relay 40 is on (closed) and the charger relay 41 is on (closed), the control circuit 66 sets the output from the high-voltage battery B1 at 144 to 197V. The third H-bridge circuit 58, which functions as a rectification circuit during charging of the high-voltage battery B1, is used as a DC/DC conversion H-bridge circuit implements DC/DC conversion of the output from the high-voltage battery B1 in the present embodiment. The switching elements S7, S10 and the switching elements S8, S9 are alternately turned on and off, so that alternating-current voltage is supplied to the first secondary coil 57b, and alternating-current voltage is induced in the second secondary coil 57c. The alternating-current voltage induced by the second secondary coil 57c is converted into direct-current voltage by the rectifier 62. The electrical power of 13 to 14 V is supplied to the complementary battery B2.

The control circuit 66 receives a feedback signal SGf2. The feedback signal SGf2 is a detection signal of output voltage to the complementary battery B2. Using the signal SGf2, the control circuit 66 implements feedback control. Unlike the operation during charging of the high-voltage battery B1, there is only one output from the charger 30 in the present embodiment. Also, the control circuit 66 can implement a feedback using a complementary output. Therefore, the control circuit 66 can stop the voltage adjustment circuit 63 on the side of complementary output, that is, putting the MOSFET in a constant ON state, so that the output from the voltage adjustment circuit 63 to auxiliary devices is unchanged.

The coil 59 connected to the high-voltage battery B1 is short-circuited by the relay 60.

At this time, the output to the auxiliary device (the battery B2) is approximately 2 kW because the output is required during driving of the vehicle.

Figure 8:
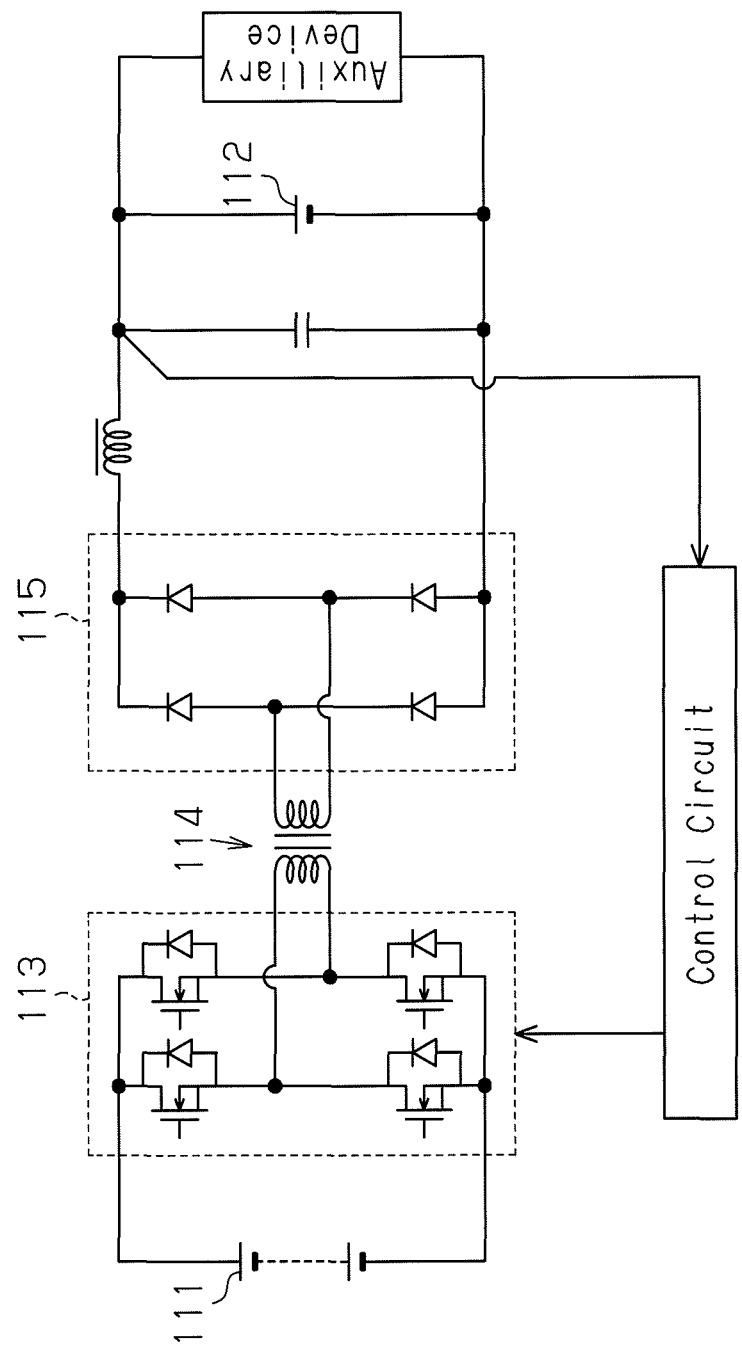
FIG. 8 is a circuit diagram showing a typical power source device.

Plug-in hybrid vehicles and an electric cars use, as a typical power source device, an on-vehicle charger for charging a high-voltage battery 111 from a commercial power source 100 shown in FIG. 6 and a DC/DC converter for supplying voltage from the high-voltage battery 111 shown in FIG. 8 to the auxiliary devices (battery 112). In FIG. 8, a DC/DC converter includes an H-bridge circuit 113, a transformer 114, a rectification H-bridge circuit 115.

The on-vehicle charger shown in FIG. 6 is used when the vehicle is not moving (when the vehicle is in a stopped state), and the DC/DC converter shown in FIG. 8 is used when the vehicle is moving. That is, although the on-vehicle charger of FIG. 6 and the DC/DC converter of FIG. 8 are not used at the same time, both of these are necessary devices to be mounted on the vehicle. Therefore, spaces for placing these need to be spared in the vehicle, and the weight of the vehicle is increased. Also, the costs for manufacturing the vehicle are increased.

In contrast, according to the present embodiment, the charger 30 has an output to the complementary battery B2 in addition to the output to the high-voltage battery B1, as shown in FIG. 3. Also, compared with the rectification H-bridge circuit 108 for output to the high-voltage battery 111 shown in FIG. 6, the third H-bridge circuit 58 shown in FIG. 4 has MOSFETs, instead of diodes of the third H-bridge circuit 108 shown in FIG. 6, so as to allow bidirectionalization. In the present embodiment, during charging of the high-voltage battery B1, the control circuit 66 outputs electrical power to the high-voltage battery B1 and the complementary battery B2 from the input. When the vehicle is moving, the control circuit 66 outputs electrical power to the complementary battery B2 from the high-voltage battery B1. As a result, in the present embodiment, the charger and the DC/DC converter (58) are integrated. This eliminates the need for the DC/DC converter 23 in the system configuration of FIG. 1.

The above described embodiment has the following advantages in addition to advantages (1) and (2) above.

(3) The control circuit 66 serving as a second control section controls the third H-bridge circuit 58 on the side of the first secondary coil 57b while implementing feeding of the output to the complementary battery B2, thereby supplying electrical power to the complementary battery B2 from the high-voltage battery B1. In other words, the control circuit 66 further includes the second control section. That is, the control circuit 66 controls the third H-bridge circuit 58 to implement DC/DC conversion on the side of the first secondary coil 57b of the transformer 57 while implementing a feedback of the output from the high-voltage battery B1 to the complementary battery B2, thereby supplying electrical power to the complementary battery B2. Accordingly, the control circuit 66 is capable of supplying electrical power from the high-voltage battery B1 to the complementary battery B2. This allows a charger and a DC/DC converter to be integrated, and promotes miniaturization and reduction in costs.

As a modification, a rectification circuit having a diode bridge may be provided at a position upstream of the first H-bridge circuit (PFC circuit) at the input section from the commercial power source 67 of FIG. 3. Also, the second H-bridge circuit 56, which is located downstream of the first H-bridge circuit (PFC circuit) 54, may be a push-pull circuit.

Figure 5:
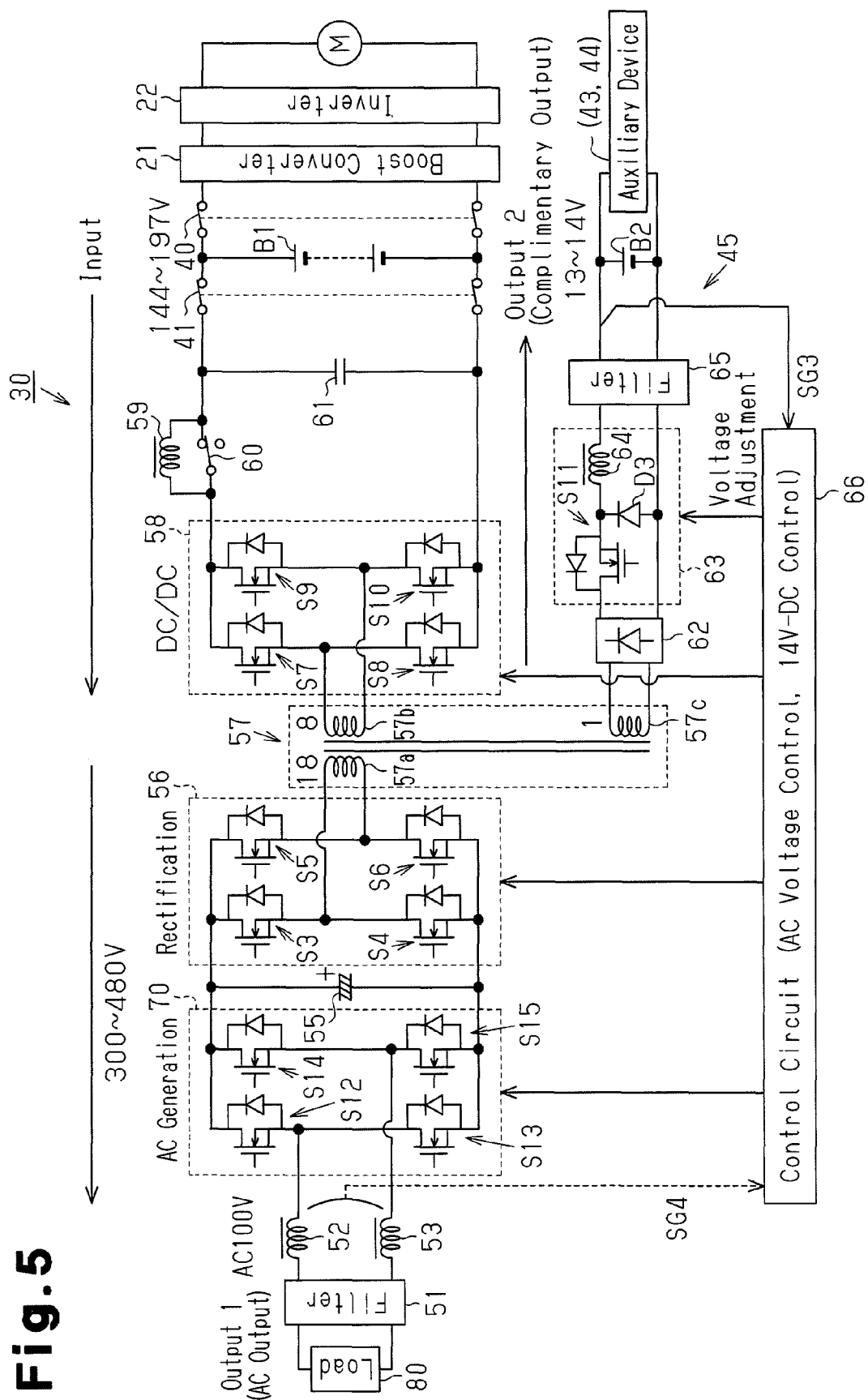
FIG. 5 is a circuit diagram of a power source device according to a third embodiment.

FIG. 5 shows a third embodiment. The differences from the first and second embodiments will be mainly discussed. In the present embodiment, alternating current is output to an alternating-current load 80 from a high-voltage battery B1 via a filter 51. The alternating-current load 80 is provided in place of the alternating-current power source 67.

FIG. 5 shows a circuit configuration of a power source device of the resent embodiment, which replaces the configuration of FIG. 2.

The diodes D1, D2 in the first H-bridge circuit (PFC circuit) in FIG. 2 are replaced by switching elements S12, S14 in FIG. 5. That is, a first H-bridge circuit 70, which replaces the H-bridge circuit 54, has four switching elements S12, S13, S14, S15. The switching elements S12, S13, S14, and S15 are each formed by a MOSFET. A parasitic diode is connected in parallel with the MOSFET. The source terminal of the switching element S12 and the drain terminal of the switching element S13 are connected to each other. The source terminal of the switching element S14 and the drain terminal of the switching element S15 are connected to each other. The drain terminal of the switching element S12 and the drain terminal of the switching element S14 are connected to each other. The source terminal of the switching element S13 and the source terminal of the switching element S15 are connected to each other.

Further, in the present embodiment also, the diode of the rectification H-bridge circuit 108 for outputting to the high-voltage battery 111 in FIG. 6 is replaced by a MOSFET in the third H-bridge circuit 58 in FIG. 5.

Operation of the power source device of the present embodiment will now be described.

First, operation during charging of the high-voltage battery B1 will be described. Since the basic actions are the same as those shown in FIG. 3, the operation during charging of the high-voltage battery B1 will be described with reference to FIG. 3.

In a state where the system main relay 40 is off (open) and the charger relay 41 is on (closed), the control circuit 66 performs output 1 (high voltage output) from the commercial power source 67 of the input to the high-voltage battery B1 and simultaneously performs output 2 to the complementary battery B2.

At this time, since the output electrical power to the complementary system is needed by the power management ECU 43 during charging of the batteries B1, B2, the complementary output is set to approximately 100 W.

Since the electrical power of the high voltage output for the high-voltage battery B1 is set at several kilo-Watts (kW), the electrical power of the high voltage output is larger than that of the complementary output. Therefore, the control circuit 66 implements a feedback of control based on the feedback signal SGf1 indicating a high voltage output, sets the complementary output as a voltage within a range of 21-26 V, which is higher than the desired voltage (approximately 13-14 V), and adjusts the voltage via the voltage adjustment circuit 63.

Next, operation during moving of the vehicle will be described. Since the basic actions are the same as those shown in FIG. 4, the operation during moving of the vehicle will be described with reference to FIG. 4.

In a state where the system main relay 40 is on (closed) and the charger relay 41 is on (closed), the control circuit 66 uses the high-voltage battery B1 as an input, and uses the third H-bridge circuit 58, which functions as a rectification circuit during charging, as a DC/DC conversion H-bridge circuit, thereby outputs electrical power from the high-voltage battery B1 to the auxiliary device (the battery B2).

Unlike the operation during charging of the high-voltage battery B1, there is only one output from the charger 30, and a feedback can be implemented using the complementary output. Therefore, the control circuit 66 stops the voltage adjustment circuit 63 of the complementary output (so that the output is unchanged).

The coil 59 connected to the high-voltage battery B1 is short-circuited by the relay 60.

At this time, the output to the auxiliary device (the battery B2) is set at approximately 2 kW because it is required during the moving of the vehicle.

Next, with reference to FIG. 5, operation during AC output from the high-voltage battery B1, that is, during output to the alternating-current load (AC load) from the high-voltage battery B1 will be described.

The control circuit 66 receives signals SG3 and SG4. The signal SG3 is a detection signal of output voltage and output current to the complementary battery B2. The signal SG4 is a detection signal of output voltage and output current to the alternating-current load 80.

In a state where the charger relay 41 is on (closed), the control circuit 66 outputs, from the high-voltage battery B1, alternating-current voltage to the alternating-current load 80. The control circuit 66 also provides output to the auxiliary devices. Specifically, the control circuit 66 outputs control signals to switch the switching elements S7 to S10 of the third H-bridge circuit 58, thereby supplying the alternating-current voltage within a range of 144-197 V of the high-voltage battery B1 to the first secondary coil 57b of the transformer 57. The switching elements S7, S10 and the switching elements S8, S9 are alternately turned on and off, so that alternating-current voltage is supplied to the first secondary coil 57b. Accordingly, alternating-current voltage is induced in the primary coil 57a and the second secondary coil 57c. The switching elements S3 to S6 of the second H-bridge circuit 56 are subjected to switching control so that the alternating-current voltage induced by the primary coil 57a is converted into direct-current voltage, and the direct-current voltage is supplied to the first H-bridge circuit 70. The switching elements S12 to S15 of the first H-bridge circuit 70 are subjected to switching control by a control signal from the control circuit 66, such that alternating-current voltage of a predetermined voltage value and predetermined frequency is generated.

Through the DC/DC conversion by the third H-bridge circuit 58 and the rectification by the second H-bridge circuit 56, the output from the high-voltage battery B1 is increased to 300 to 480 V. Through the AC generation by the first H-bridge circuit 70, the first H-bridge circuit 70 outputs AC100 V to the alternating-current load 80.

On the other hand, the alternating-current voltage induced by the second secondary coil 57c is converted into direct-current voltage by the rectifier 62, and its voltage value is adjusted by the voltage adjustment circuit 63. Thereafter, the converted direct-current voltage is supplied to the complementary battery B2. The complementary output is 13 to 14 V.

The control circuit 66 implements a feedback using the complementary output by the signal SG3, and adjusts the AC output voltage (output voltage to the alternating-current load 80) using the first H-bridge circuit 70 for generating AC.

Also, the control circuit 66 monitors both of the complementary output (to the battery B2) and the output to the alternating-current load 80, so as prevent the outputs from surpassing the rating of the transformer 57.

Figure 9:
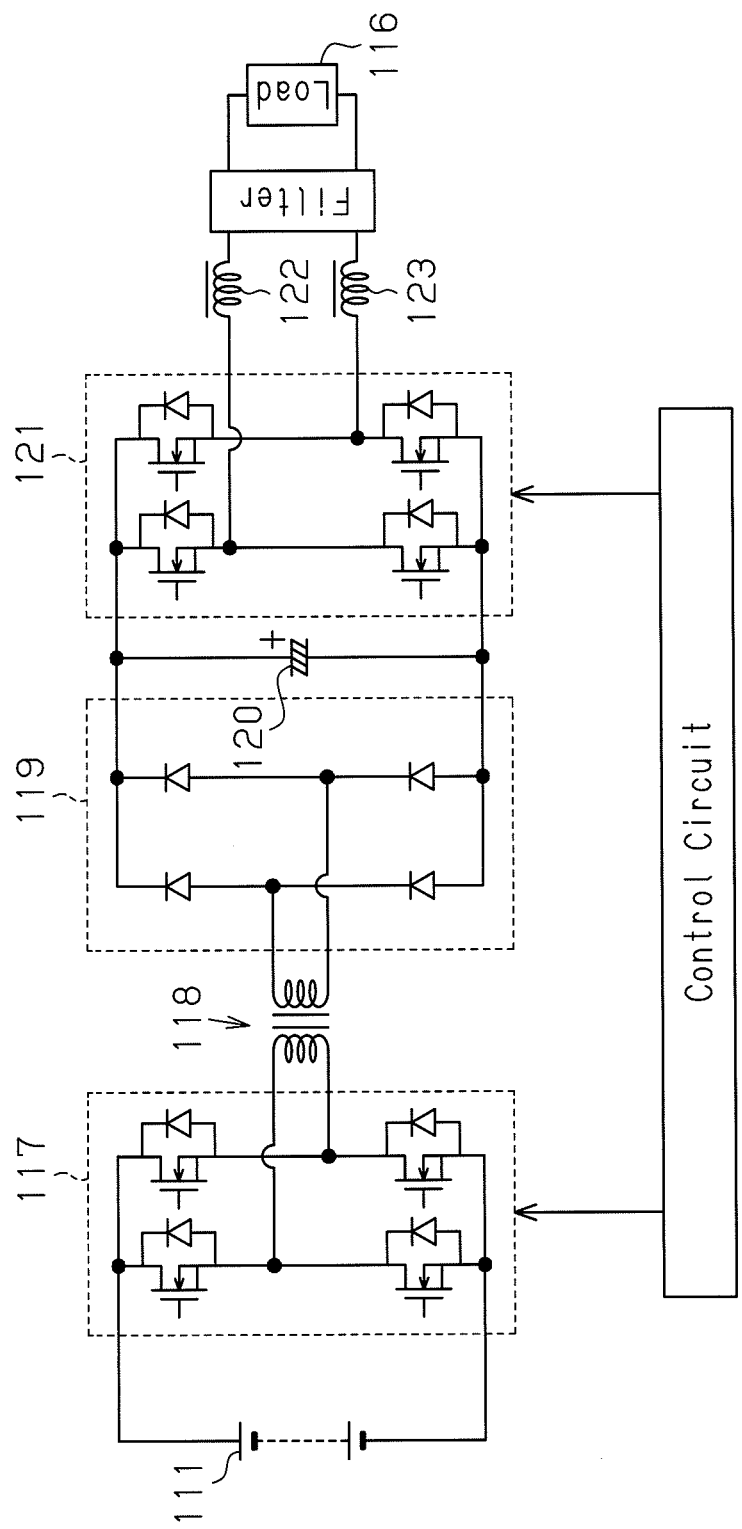
FIG. 9 is a circuit diagram showing a typical power source device.

FIG. 9 shows an exemplary configuration of a typical power supply system (AC inverter) for an alternating-current load 116 from a high-voltage battery 111. In FIG. 9, the power supply system includes, in the order from the high-voltage battery 111 to the load 116, a DC/DC conversion H-bridge circuit 117, a transformer 118, a rectification H-bridge circuit 119, a capacitor 120, an AC generation H-bridge circuit 121, and coils 122, 123.

The on-vehicle charger shown in FIG. 6 is used when the vehicle is not moving (when the vehicle is in a stopped state), and the DC/DC converter shown in FIG. 8 is used when the vehicle is moving. That is, although the on-vehicle charger of FIG. 6 and the DC/DC converter of FIG. 8 are not used at the same time, both of these are necessary devices to be mounted on the vehicle. Therefore, spaces for placing these need to be spared in the vehicle, and the weight of the vehicle is increased. Also, the costs are increased. Also, as shown in FIG. 9, an AC inverter is required for using the high-voltage battery 111 to use an alternating-current load (a commercial power source-driven device) 116.

In contrast to FIGS. 6 and 9, the present embodiment provides a circuit configuration shown in FIG. 5, so that the charger 30 has an output to the complementary battery B2 in addition to the output to the high-voltage battery B1. Also, a rectifying diode of the power factor correction H-bridge circuit 104 of FIG. 6 is replaced by a MOSFET in the first H-bridge circuit 70 of FIG. 5. Further, compared with the rectification H-bridge circuit 108 for output to the high-voltage battery 111 shown in FIG. 6, the diode of the third H-bridge circuit 58 of FIG. 5 is replaced by a MOSFET, so as to allow bidirectionalization.

During charging of the high-voltage battery B1, the control circuit 66 outputs electrical power to the high-voltage battery B1 and the complementary battery B2 from the input from the alternating-current power source 67. When the vehicle is moving, the control circuit 66 outputs electrical power from the high-voltage battery B1 to the complementary battery B2. Further, when the vehicle is stopped and the supply of electrical power from the high-voltage battery B1 to the alternating-current load 80 is needed, the control circuit 66 outputs electrical power from the high-voltage battery B1 to the alternating-current load 80.

The above described embodiment has the following advantages in addition to advantages (1), (2), and (3) above.

(4) The control circuit 66 serving as the third control section outputs alternating current from the high-voltage battery B1 to the alternating-current load 80 (67), and supplies electrical power to the complementary battery B2 at the same time. In other words, the control circuit 66 further includes the third control section. According to this configuration, the control circuit 66 is capable of simultaneously outputting alternating-current from the high-voltage battery B1 to the alternating-current load 80 and supplying electrical power from the high-voltage battery B1 to the low-voltage complementary battery B2.

(5) The control circuit 66 serving as the fourth control section controls the third H-bridge circuit 58 while implementing a feedback of the output to the alternating-current load 80, thereby generating alternating current using the second H-bridge circuit 56 and the first H-bridge circuit 54 on the side of the primary coil 57a of the transformer 57, and outputs alternating-current voltage to the alternating-current load 80 (the commercial power source 67) from the high-voltage battery B1. In other words, the control circuit 66 further includes the fourth control section. Simultaneously, the control circuit 66 supplies electrical power to the complementary battery B2 on the side of the second secondary coil 57c from the high-voltage battery B1. That is, the control circuit 66 implements DC/DC conversion using the third H-bridge circuit 58, thereby implementing rectification using the second H-bridge circuit 56 on the side of the primary coil 57a of the transformer 57 and generating alternating current using the first H-bridge circuit 54, and outputs alternating-current voltage from the high-voltage battery B1. Simultaneously, the control circuit 66 supplies electrical power to the complementary battery B2 on the side of the second secondary coil 57c of the transformer 57, using the output of the high-voltage battery B1. At this time, while implementing a feedback of the output to the complementary battery B2, the control circuit 66 implements DC/DC conversion using the third H-bridge circuit 58, rectification using the second H-bridge circuit, and generation of alternating current using the first H-bridge circuit 54.

Since a feedback of the output of the alternating-current voltage is implemented, the control circuit 66 can supply electrical power to the complementary battery B2 at the same time as outputting alternating current to the alternating-current load 80. In other words, the control circuit 66 is capable of outputting alternating-current voltage as well as supplying electrical power from the high-voltage battery B1 to the complementary battery B2. Thus, according to the present embodiment, a charger, a DC/DC converter, and an AC inverter can be integrated, and miniaturization and reduction in costs are promoted.

(6) In the advantage (5) above, the control circuit 66 serving as the fifth control section outputs alternating-current voltage to the alternating-current load 80 by generating alternating current using the third H-bridge circuit 58, the second H-bridge circuit 56, and the first H-bridge circuit 54, while implementing a feedback of the output to the complementary battery B2. Simultaneously, the control circuit 66 supplies electrical power to the complementary battery B2 on the side of the second secondary coil 57c, using the high-voltage battery B1. Therefore, by implementing a feedback of both of the supply of electrical power to the complementary battery B2 and the alternating-current output, the control circuit 66 prevents the rating of the transformer 57 from being surpassed. In other words, the control circuit 66 has the fifth control section.

As a modification, if the amount of electrical power of the output to the auxiliary device (the battery B2) is small at the time of AC output from the high-voltage battery B1 (at the time of output to the alternating-current load 80), the control circuit 66 may implement feedback control using the AC output (the output to the alternating-current load 80). That is, while implementing a feedback of the output of alternating-current voltage, the control circuit 66 may implement DC/DC conversion using the third H-bridge circuit 58, rectification using the second H-bridge circuit, and generation of alternating current using the first H-bridge circuit 54.

The present invention is not restricted to the illustrated embodiments but may be embodied in the following modifications.

The switching elements may be formed by IGBTs, instead of MOSFETs.

FIG. 1 shows a system configuration in which the voltage of the high-voltage battery B1 is increased by the boost converter 21 and is supplied to the inverter 22. Instead, the boost converter 21 may be omitted from the system, and the high-voltage battery B1 and the inverter 22 may be directly connected to each other via a high-voltage line LH to supply the voltage of the high-voltage battery B1 to the inverter 22.

The power source device 10 is not limited to use for a vehicle. For example, the power source device 10 may be used as a power source device for factories, offices, and households that charges the battery B1 using off-peak electrical power at night and uses the charged electrical power during the day.

The illustrated embodiments may be applied to a power source device having a plurality of first batteries B1. That is, the illustrated embodiments can be applied to a power source device having at least one first battery.

The illustrated embodiments may be applied to a power source device having a plurality of second batteries B2. That is, the illustrated embodiments can be applied to a power source device having at least one second battery, the voltage of which is lower than that of the first battery.

Any transformer can be used as long as it includes at least one first secondary coil connected to the first battery B1 and at least one second secondary coil connected to the second battery B2.

The invention claimed is:

1. A power source device comprising:
   at least one first battery;
   at least one second battery, the voltage of which is lower than that of the first battery;
   a transformer having a primary coil, to which an alternating-current power source is connected, at least one first secondary coil, to which the first battery is connected, and at least one second secondary coil, to which the second battery is connected;
   a first power conversion circuit located between the primary coil of the transformer and the alternating-current power source;
   a second power conversion circuit located between the primary coil of the transformer and the first power conversion circuit;
   a third power conversion circuit located between the first secondary coil and the first battery;
   a rectification circuit located between the second secondary coil and the second battery;
   a voltage adjustment circuit located between the rectification circuit and the second battery; and
   a control section that charges the first battery using the alternating-current power source, and, simultaneously supplies electrical power to the second battery.

2. The power source device according to claim 1, wherein the control section includes a first control section, and the first control section charges the first battery using the alternating-current power source by, on a side of the primary coil, controlling the first power conversion circuit and the second power conversion circuit while implementing a feedback of the output to the first battery, and by, on a side of the first secondary coil, controlling the third power conversion circuit, and simultaneously, the first control section supplies, on the side of the second secondary coil, electrical power to the second battery from the alternating-current power source, while adjusting the output voltage of the second battery by the voltage adjustment circuit.

3. The power source device according to claim 1, wherein the control section includes a second control section, and the second control section supplies electrical power to the second battery from the first battery by, on the side of the first secondary coil, controlling the third power conversion circuit while implementing a feedback of the output to the second battery.

4. The power source device according to claim 1, wherein the control section includes a third control section, and the third control section outputs alternating current to the side of the alternating-current power source from the first battery, and, simultaneously supplies electrical power to the second battery.

5. The power source device according to claim 4, wherein the control section includes a fourth control section, and the fourth control section generates, on the side of the primary coil of the transformer, alternating current using the second power conversion circuit and the first power conversion circuit by controlling the third power conversion circuit while implementing a feedback of the output from the alternating-current power source, and outputs alternating-current voltage to the side of the alternating-current power source from the first battery, and simultaneously, the fourth control section supplies, on the side of the second secondary coil, electrical power to the second battery.

6. The power source device according to claim 5, wherein the control section further includes a fifth control section that implements a feedback of the output to the second battery.

7. The power source device according to claim 1, wherein the power source device is designed for being mounted on a vehicle.

8. The power source device according to claim 7, wherein the second battery is a complementary battery.

9. A power source device for a vehicle, the device comprising:
   at least one first battery;
   at least one second battery, the voltage of which is lower than that of the first battery, wherein a device that is activated at least during charging is connected to the second battery;

a control circuit connected to the first battery via a line, the control circuit controlling a load;

a system main relay provided on the line; and a charger connected to a part of the line between the system main relay and the first battery, the charger being capable of charging the first battery using an external alternating-current power source, wherein the charger includes:

a transformer having a primary coil, to which an alternating-current power source is connected, at least one first secondary coil, to which the first battery is connected, and at least one second secondary coil, to which the second battery is connected;

a first power conversion circuit located between the primary coil of the transformer and the alternating-current power source;

a second power conversion circuit located between the primary coil of the transformer and the first power conversion circuit;

a third power conversion circuit located between the first secondary coil and the first battery;

a rectification circuit located between the second secondary coil and the second battery;

a voltage adjustment circuit located between the rectification circuit and the second battery; and a control section that charges, in a state where the system main relay is open, the first battery using the alternating-current power source, and, simultaneously supplies electrical power to the second battery.

10. The power source device for a vehicle according to claim 9, wherein the control section includes a first control section, and the first control section charges the first battery using the alternating-current power source by, on the side of the primary coil, controlling the first power conversion circuit and the second power conversion circuit while implementing a feedback of the output to the first battery, and by, on a side of the first secondary coil, controlling the third power conversion circuit, and simultaneously, the first control section supplies, on the side of the second secondary coil, electrical power to the second battery from the alternating-current power source, while adjusting the output voltage of the second battery by the voltage adjustment circuit.

11. The power source device for a vehicle according to claim 9, wherein the control section includes a second control section, and the second control section supplies electrical power to the second battery from the first battery by, on the side of the first secondary coil, controlling the third power conversion circuit while implementing a feedback of the output to the second battery.

12. The power source device for a vehicle according to claim 9, wherein the control section includes a third control section, and the third control section outputs alternating current to the side of the alternating-current power source from the first battery, and, simultaneously supplies electrical power to the second battery.

13. The power source device for a vehicle according to claim 12, wherein the control section includes a fourth control section, and the fourth control section generates, on the side of the primary coil of the transformer, alternating current using the second power conversion circuit and the first power conversion circuit by controlling the third power conversion circuit while implementing a feedback of the output from the alternating-current power source, and outputs alternating-current voltage to the side of the alternating-current power source from the first battery, and simultaneously, the fourth control section supplies, on the side of the second secondary coil, electrical power to the second battery.

14. The power source device for a vehicle according to claim 13, wherein the control section further includes a fifth control section that implements a feedback of the output to the second battery.

\* \* \* \* \*